United States Patent Office 3,377,168

Patented Apr. 9, 1968

3,377,168

PHOTOGRAPHIC STRIPPING FILM

John P. Mally, Glen Cove, and Jacob R. Nussbaum, Rego Park, N.Y., assignors to Powers Chemco, Inc., Glen Cove, N.Y., a corporation of New York No Drawing. Filed July 7, 1965, Ser. No. 470,224
8 Claims. (Cl. 96—83)

This invention relates to an improved photographic stripping film useful in the graphic arts. More particularly, it relates to light-sensitive stripping films which are suitable for use in rotogravure and similar printing processes.

Conventional stripping films comprise a film support, a stripping layer and a light-sensitive photographic emulsion layer. Intermediate the several essential layers there are conventionally positioned various coating materials and subbing layers. In use, the composite stripping film is exposed under the desired conditions and is thereafter immersed in a suitable photographic developer and then washed and fixed. After subsequent washing and drying, the film is generally applied emulsion side down on a clean metal surface such as a copper rotogravure cylinder or a zinc photoengraving plate, after which the film support and the stripping layer are removed by physical stripping and/or by other methods, leaving the developed emulsion layer as a coating on the metal surface. The coated metal surface is then suitably treated to remove the unexposed, unhardened gelatin in the emulsion layer, thus forming a relief image of varying intensity. Once this step is accomplished, the metal surface is then etched with a suitable etchant to impress the desired image onto the metal surface itself.

The stripping film of this invention also comprises a film support, a stripping layer, and a light-sensitive photographic emulsion layer. Both the stripping layer and the light-sensitive photographic emulsion layer can be any of those conventionally employed. It has been found, however, that particularly effective results are obtained when the stripping layer comprises a phenoxy resin.

Phenoxy resins are a relatively new type of plastic. Their physical and chemical properties are described in several recent articles including "Phenoxy—A New Thermoplastic," Rubber & Plastics Age, vol. 45, pages 62 to 63 (1964); Siegrist, "Phenoxy . . . A New Engineering Plastic," Metals Progress, vol. 84, No. 3, pages 102 to 104 (1963); Nelson et al., "Formulating with Phenoxies," Paint Varnish Prod., vol. 54, No. 12, pages 34 to 39 (1964).

Further details including the method of manufacturing phenoxy resins are disclosed in French Patent No. 1,358,672, dated Apr. 17, 1964. The phenoxy resins are therein referred to as polyhydroxyethers. In essence, these resins are manufactured by reacting a polynuclear diphenol with an epihalohydrin in the presence of an alkali. The product is dissolved in a suitable organic solvent and the organic phase is separated to yield the polymer.

These phenoxy resins are related to epoxy resins in that both are made from the same starting materials. However, the phenoxy resins have a much higher molecular weight and are characterized by the substantial absence of epoxy groups.

The general structural formula of the phenoxy resins is believed to be characterized by the repeating group:

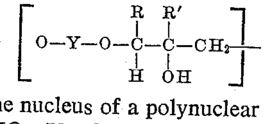

wherein Y is the nucleus of a polynuclear diphenol having the structure HO—Y—OH in which the hydroxyl groups are each attached to different aromatic rings. The general and preferred examples of polynuclear diphenols are set out at page 14 of French Patent No. 1,358,672. R and R′ are selected from among hydrogen and methyl.

The preferred species of phenoxy resin is the reaction product of 2,2-bis-(4-hydroxylphenyl) propane (Bisphenol A) and epichlorohydrin having a molecular weight in the range of approximately 25,000 to 50,000 preferably less than 40,000. This preferred phenoxy resin polymer is believed to have the following structure:

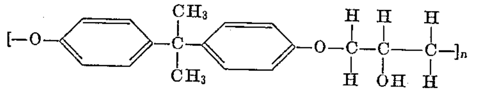

where $n$ is approximately 100. A particular method of manufacturing this polymer is described in Chemical Abstracts, vol. 62, 4183d (Feb. 15, 1965) and in the above-mentioned French patent. This preferred polymer is commercially available as Bakelite resin PKDA 8500.

The film support can be any of those conventionally employed for that purpose including any of the hydrophobic organic polymers conventionally employed, such as cellulose acetate and other cellulose carboxylic acid esters; cellulose nitrate; polyamides, such as nylon; and polystyrene. The preferred film support materials are the polymethylene terephthalates such as, for example, the frequently-employed polyethylene terephthalate. Polymethylene terephthalates generally are produced by the esterification of a polymethylene glycol containing from 2 to 10 carbon atoms with terephthalic acid in a procedure such as that described, for example, in U.S. Patent No. 2,465,319. The thickness of the film support can range generally from about 3 to 10 mils and preferably from 6 to 9 mils. The particularly preferred film support thickness in the case of polyethylene terephthalate and cellulose triacetate films is about 7½ mils, while in the case of polystyrene film supports, the thickness will generally be closer to about 10 mils. Preferably, the film support will be of a material that is substantially transparent.

The light-sensitive photographic emulsion layer can be made of any conventionally employed light-sensitive material. Gelatin-silver halide emulsion layers are usually preferred. In general, the characteristics of the light-sensitive emulsion layer will be determined by the ultimate use to be made of the stripping film. The emulsion layer is preferably free from hardening agents but should be capable of being differentially hardened in either a hardening developer or a bleaching bath so that a relief image might be formed by washing away the unexposed and therefore unhardened emulsion. In conventionally light-sensitive silver halide emulsions, the ratio of gelatin to silver halide is generally quite high, there frequently being from about 2 to 5 parts of gelatin by weight per part of silver halide. Any desirable light-sensitive silver halide might be used such as, for example, silver chloride, silver bromide, silver iodobromide, and silver-chloride-silver-bromide mixtures. Where desired, dyes may be incorporated in the silver halide emulsion for various conventional purposes such as photographic sensitizing dyes which serve to extend sensitivity to various portions of the spectrum.

In preparing the stripping film of this invention, the film support is formed in any conventional fashion to the desired thickness and on one side thereof, a phenoxy resin layer ranging in thickness from 0.05 mil to 0.2 mil is applied. Excellent results are obtained with a phenoxy resin layer of approximately 0.1 mil. It is preferred, but not indispensable, that the phenoxy resin layer, as applied to the film support, contain plasticizers including a water-soluble plasticizer and a water-insoluble plasticizer. The precise ratio concentration of water-soluble and water-insoluble plasticizers can be varied widely. Approximately equal volumes of each are satisfactory, but in general from about 1 to about 10 parts by volume of water-soluble plasticizer can be used per part of water-insoluble plasticizer. The total quantity of plasticizers needed in the resin as well as their relative proportion is a matter for determination by trial and error, depending upon such factors as film thickness, polymer molecular weight, developing chemicals, lay-down technique, atmospheric humidity, etc. While the method of applying the phenoxy resin layer to the film support is not critical, it is frequently desirable to dissolve the phenoxy resin powder in a suitable solvent and add the plasticizers to the solution. The phenoxy resin layer would thereupon be cast on the film support in conventional fashion. After evaporation of the solvents, a plasticized phenoxy resin layer of the desired thickness would remain.

For better stripping, it is often preferred that a gelatin subbing layer be applied to the film support before application thereover of the phenoxy resin layer. Such a subbing layer acts to promote adhesion. The gelatin subbing layer can be any of those known to the art for this purpose, which provides a water-soluble gelatin layer of a thickness of from about 0.05 micron to about 1 micron.

After the application of the phenoxy resin stripping layer, it is preferred, although not always essential, to apply a water-soluble gelatin subbing layer thereover before application of the light-sensitive emulsion layer. While any gelatin subbing layer can be employed, it is often preferred to form the layer from a solution of gelatin in a mixture of acetic acid and methyl alcohol in which the volumetric ratio of acetic acid to methyl alcohol would range from about 1 to about 10, and the percent by weight of gelatin in the solution would be from about ½% to 5%. Such a subbing layer would generally be applied at a thickness of from about .05 micron to about 1 micron.

Thereafter, the emulsion layer is applied to a thickness of from about 0.2 to 1 mil and preferably about 0.4 to 0.8 mil.

The opposite side of the film support can, if desired, be treated by any of the methods well known in the art. For example, if the film support is a polymethylene terephthalate composition, it can contain a surface coating of any of a number of materials conventionally employed such as a copolymer of vinylidene chloride/acrylonitrile/itaconic acid. Anti-halation layers such as are conventionally employed can also be used in conventional fashion.

The light exposure necessary to form a suitable image can be varied to meet the requirements of the situation and the characteristics of the particular emulsion. After the film has been exposed in a suitable device, it is developed in any one of the conventional tanning or hardening developers. In the case of the preferred silver halide emulsions, it is preferred to use developers whose principal developing ingredients are pyrogallol and/or catechol. Hydroquinone-based developers can be used, but are somewhat less preferred. After developing in accordance with the requirements of the light-sensitive emulsion and the particular developer employed, the film is washed and fixed in conventional fashion and washed again.

The use of a photographic conditioner solution after the final washing is preferred as it tends to control the plasticity of the gelatin layer leading to more consistently uniform results. Various conditioners can be employed including mixtures of ethyl alcohol and water containing 5% by volume of ethylene glycol. Additional ingredients such as 5% by volume of diethylene glycol, 1% by volume of glacial acetic acid, or 14% by volume of a 70% solution of sorbitol can be included in the conditioner.

After conditioning, the film is dried in air and applied emulsion side down on a suitable metal surface such as a clean copper surface by conventional techniques.

Conventionally, one edge of the film is taped down with masking tape to prevent relative movement, while the balance is rolled on with the application of sufficient pressure to prevent irregularities. After the film is completely applied to the metal surface, the film support, such as the polymethylene terephthalate, can be peeled away. This is done by lifting a corner and simply peeling back. The phenoxy resin and the intermediate subbing layer, if any, will remain in position attached to the emulsion layer. When it is desired to remove the phenoxy resin stripping layer, a suitable swelling agent or solvent for the resin can be employed. The solvents or swelling agents are applied such as by flowing over or sponging the exposed surface of the phenoxy resin stripping layer. Solvents such as, for example, acetone, Cellosolve acetate ($CH_3COOCH_2CH_2OC_2H_5$), or methylethyl ketone when applied, dissolve away the resin leaving the developed photographic emulsion layer exposed. A swelling agent such as methyl alcohol is preferred, since upon application, it causes the phenoxy resin to become cloudy and to loosen from the surface. The swelled resin can then be stripped off giving visible evidence of complete removal.

After removal, whether by solution or stripping of the phenoxy resin layer, the residual emulsion layer is treated as with warm water to dissolve the unhardened portions of the gelatin silver halide emulsion layer. To insure proper removal of all of the unhardened emulsion, a final rinse of an ethanol-water mixture containing approximately 75% ethyl alcohol can be used. After the plate is dried, the image can be etched in the metal surface through the use of a conventional etchant such as, for example, ferric chloride in the case of a copper plate.

The following example illustrates a preferred mode of preparing and using the stripping film of this invention.

A 0.5 micron thick gelatin subbing layer was applied to one side of a photographic grade polyethylene terephthalate film support of a thickness of approximately 7.5 mils. The subbing layer was applied by first dipcoating the film in a solution of 3% trichloroacetic acid in toluene as per U.S. Patent No. 2,893,896, heating to 150 to 250° C. and then applying a 2% aqueous gelatin solution and drying.

A phenoxy resin stripping layer was cast to a thickness of 0.1 mil over the subbing layer from a solution having the following composition:

| | | |
|---|---|---|
| Phenoxy resin (Bakelite resin PKDA 8500) | grams | 560 |
| Methyl ethyl ketone | liters | 4 |
| Cellosolve acetate | do | 4 |
| Tetrahydrofurfuryl phosphate (water-soluble plasticizer) | cc | 56 |
| Dibutyl tartrate (water-soluble plasticizer) | cc | 56 |

Thereafter, a second gelatin subbing layer was applied to a thickness of 0.5 micron by casting from a solution containing the following ingredients:

| | | |
|---|---|---|
| Gelatin | grams | 1 |
| Methyl alcohol | cc | 90 |
| Acetic acid | cc | 10 |

A conventional light-sensitive orthochromatic silver chloride-bromide gelatin emulsion layer was then applied thereover to a thickness of approximately 0.6 mil. This emulsion can be prepared from the following components:

(A)

| | | |
|---|---|---|
| Potassium bromide | grams | 192.5 |
| Sodium chloride | do | 265 |
| Gelatin | do | 500 |
| Hydrochloric acid | cc | 2.5 |
| Water | cc | 5,000 |

(B)

| | | |
|---|---|---|
| Silver nitrate | grams | 500 |
| Water | cc | 5,000 |

(C)

| | | |
|---|---|---|
| Gelatin | grams | 500 |
| Water | cc | 5,000 |

Mixture A is heated at 5° C. to dissolve the salts. Mixtures B and C are heated at the same temperature and then mixed by adding B to C. The resultant mixture is then added slowly over a period of two hours into Mixture A, with agitation, followed by digestion for about 60 minutes. An additional 500 grams of gelatin are then dissolved in the mixture. The resultant mixture is applied over the subbing layer and allowed to set.

The emulsion layer contained from about 5 to about 35 mg. of silver halide per square meter, approximately 25 mol percent of the silver halide being silver chloride.

The resulting film was exposed through a half-tone screen with a yellow light source located at a distance of 4½ feet from the film during an exposure time of from one to two seconds. The yellow light source was a 12 volt, 11 watt, tungsten lamp having a yellow filter. After this exposure, the half-tone screen was removed and the film then exposed in the presence of ultra-violet light emanating from four 2 watt, 110 volt argon lamps located at about 4½ feet from the film for a period of from 3 to 6 seconds. The exposed film would then be processed in a conventional two-bath hardening developer by immersion for about three minutes in A and for about two minutes in B solution. A suitable A solution contains the following ingredients:

| | | |
|---|---|---|
| Sodium metabisulfite | grams | 5 |
| Pyrogallol | do | 5 |
| Anionic wetting agent (Eumercin NB) 10% aqueous solution | ml | 2 |
| Water to make 1 liter. | | |

A suitable B solution contains:

| | | |
|---|---|---|
| Sodium carbonate monohydrate | grams | 100 |
| Anionic wetting agent | ml | 2 |
| Water to make 1 liter. | | |

After development, the film is washed for one minute at 68° F. and then fixed for about three minutes in a non-hardening fixing solution such as one containing about 200 grams of sodium thiosulfate per liter. After fixing, the film is washed for ten minutes in water at room temperature to improve the etch and remove all residual chemicals. The film is then placed in a conditioner having the following composition:

| | Cc. |
|---|---|
| Ethyl alcohol | 75 |
| Water | 25 |
| Diethylene glycol | 5 |
| Glacial acetic acid | 1 |

for a period of 1–3 minutes, after which the film is dried, and then applied to a clean copper surface while the surface is being wet with flowing water by standard procedures. The polyethylene terephthalate layer is easily stripped off manually. Methyl alcohol is flowed over the phenoxy resin layer, causing it to turn cloudy and permitting easy manual stripping off of the phenoxy resin layer. The remaining material is rinsed in cold water and dried at room temperature with a relative humidity of 50% to 70%. Thereafter, warm water at a temperature of 45° C. to 50° C. is applied to remove the unhardened gelatin. The temperature of the water is gradually lowered to room temperature toward the end of the operation and a final rinse of 75% ethyl alcohol-water solution was applied. Any residual resist can be removed by lightly sponging and thereupon the surface is dried at 50% to 70% relative humidity. Excellent printing results are obtained after conventional etching with a ferric chloride etching solution.

What is claimed is:

1. A photographic stripping film useful for photographic applications comprising a film support, a phenoxy resin stripping layer, and a light-sensitive gelatin-silver halide emulsion layer.

2. A stripping layer as in claim 1 wherein the phenoxy resin is a copolymer of epichlorohydrin and Bisphenol A having a molecular weight of from about 30,000 to about 40,000.

3. A stripping film as in claim 2 wherein the film support comprises polyethylene terephthalate.

4. A stripping film as in claim 1 wherein the light-sensitive layer comprises a gelatin-silver chloride-bromide emulsion layer.

5. A photographic stripping film useful in the Graphic Arts comprising, in order, a polymethylene terephthalate layer, a subbing layer, a layer of phenoxy resin, a subbing layer and a layer of an orthochromatically sensitized gelatin silver chloride-bromide emulsion.

6. A photographic stripping film as in claim 5 wherein the phenoxy resin layer contains a water-soluble and a water-insoluble plasticizer.

7. A photographic stripping film as in claim 6 wherein the water-soluble plasticizer is tetrahydrofurfuryl phosphate.

8. A photographic stripping film as in claim 6 in which the water-insoluble plasticizer is dibutyl tartrate.

References Cited

UNITED STATES PATENTS 3,210,187 10/1965 Thommes ---------- 96—83 XR

NORMAN G. TORCHIN, *Primary Examiner.*

R. H. SMITH, *Assistant Examiner.*